(12) United States Patent
Tamaru et al.

(10) Patent No.: US 11,749,293 B2
(45) Date of Patent: Sep. 5, 2023

(54) AUDIO SIGNAL PROCESSING DEVICE

(71) Applicant: Sony Interactive Entertainment Inc., Tokyo (JP)

(72) Inventors: Yoshihiko Tamaru, Kanagawa (JP); Tetsuro Horikawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 305 days.

(21) Appl. No.: 17/261,224

(22) PCT Filed: Jul. 16, 2019

(86) PCT No.: PCT/JP2019/027983
§ 371 (c)(1),
(2) Date: Jan. 19, 2021

(87) PCT Pub. No.: WO2020/017518
PCT Pub. Date: Jan. 23, 2020

(65) Prior Publication Data
US 2021/0272579 A1 Sep. 2, 2021

(30) Foreign Application Priority Data

Jul. 20, 2018 (JP) .................. 2018-136887

(51) Int. Cl.
*H04B 15/00* (2006.01)
*G10L 21/0232* (2013.01)
(Continued)

(52) U.S. Cl.
CPC .......... *G10L 21/0232* (2013.01); *G10L 17/00* (2013.01); *H04R 1/08* (2013.01); *G10L 2021/02163* (2013.01)

(58) Field of Classification Search
CPC ...... H04R 1/08; H04R 3/005; H04R 2430/20; G10L 21/0208; G10L 17/00;
(Continued)

(56) References Cited

U.S. PATENT DOCUMENTS 7,970,147 B2   6/2011  Mao
8,639,516 B2   1/2014  Lindahl
(Continued)

FOREIGN PATENT DOCUMENTS

JP    2007532946 A    11/2007
JP    2008236448 A    10/2008
(Continued)

OTHER PUBLICATIONS

International Preliminary Report on Patentability and Written Opinion for corresponding PCT Application No. PCT/JP2019/027983, 7 pages, dated Jan. 21, 2021.
(Continued)

*Primary Examiner* — Md S Elahee
(74) *Attorney, Agent, or Firm* — Matthew B. Dernier, Esq.

(57) ABSTRACT

Provided is an audio signal processing device that receives an operation input made by a user and performs noise removal processing for removing noise from a collected audio signal collected by a microphone, and that changes content of the noise removal processing according to content of the operation input.

6 Claims, 5 Drawing Sheets

(51) Int. Cl.
*G10L 17/00* (2013.01)
*H04R 1/08* (2006.01)
*G10L 21/0216* (2013.01)

(58) Field of Classification Search
CPC ....... G10L 21/0232; G10L 2021/02163; G10L 2021/02166; G10K 11/175
USPC ........................................................ 381/94.1
See application file for complete search history.

(56) References Cited

U.S. PATENT DOCUMENTS

| | | | |
|---|---|---|---|
| 2005/0226431 A1 | 10/2005 | Mao | |
| 2009/0175462 A1 | 7/2009 | Varma | |
| 2011/0300806 A1* | 12/2011 | Lindahl | ............... G10L 21/0208 |
| | | | 455/63.1 |
| 2013/0343555 A1 | 12/2013 | Yehuday | |

FOREIGN PATENT DOCUMENTS

| | | |
|---|---|---|
| JP | 2012155184 A | 8/2012 |
| JP | 2013527499 A | 6/2013 |
| JP | 2013137540 A | 7/2013 |

OTHER PUBLICATIONS

Notice of Reasons for Refusal for corresponding JP Application No. 2020-531322, 10 pages, dated Feb. 15, 2022.
International Search Report for corresponding PCT Application No. PCT/JP2019/027983, 4 pages, dated Oct. 8, 2019.

\* cited by examiner

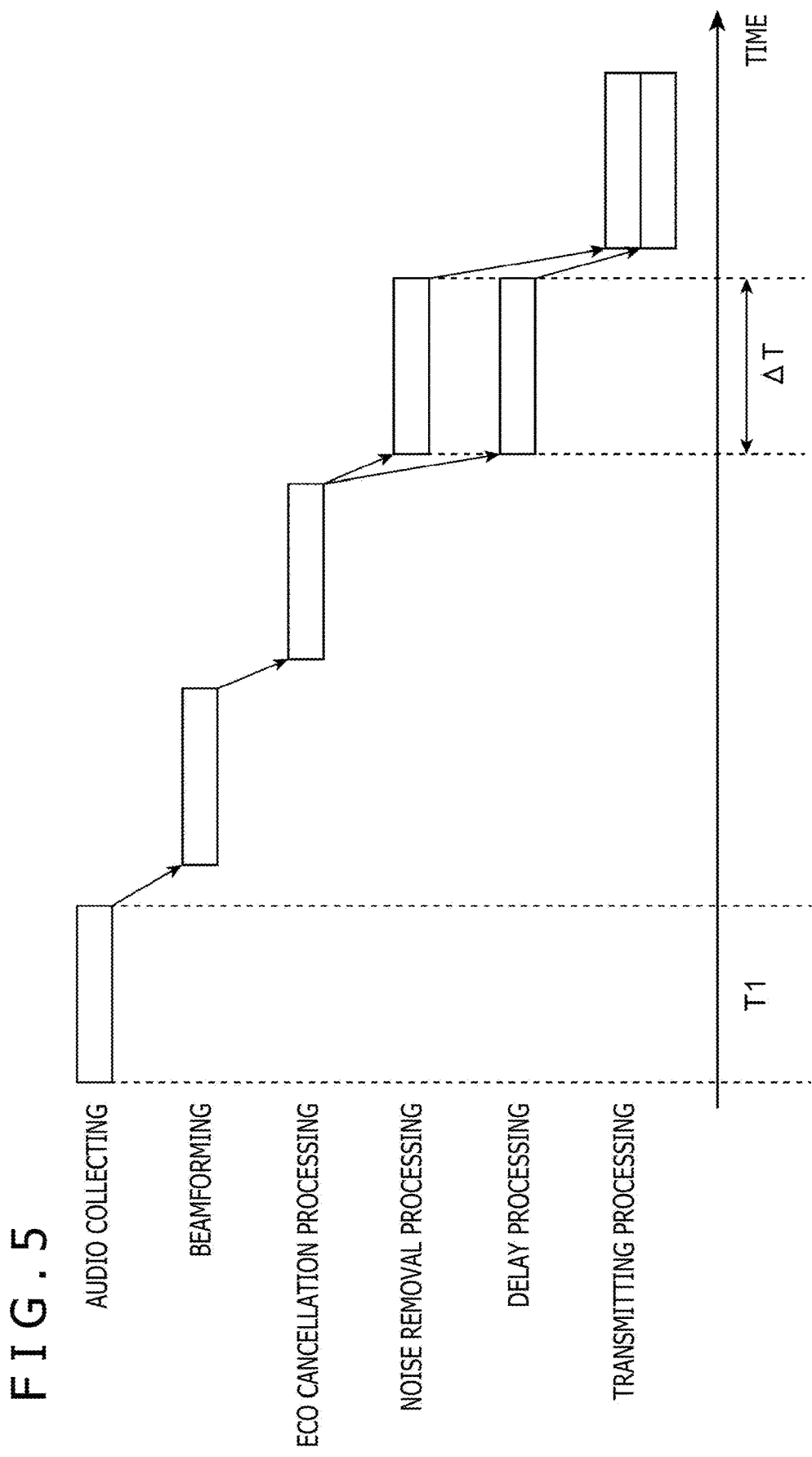

AUDIO SIGNAL PROCESSING DEVICE

TECHNICAL FIELD

The present invention relates to an audio signal processing device that processes an audio signal collected by a microphone, and an audio signal processing method.

BACKGROUND ART

There is known an audio signal processing device including a microphone that collects audio. Such an audio signal processing device sometimes performs noise removal processing, on audio signals collected by the microphone, for removing noise.

SUMMARY

Technical Problem

The noise targeted for the noise removal processing may contain operation sound caused by user's operations onto operation members included in the audio signal processing device.

The present invention has been made in view of the above actual situation, and one of objects of the present invention is to provide an audio signal processing device and an audio signal processing method that make it possible to effectively remove noise due to such operation sound, from the audio signals collected by the microphone.

Solution to Problem

An audio signal processing device according to the present invention includes an operation input reception unit that receives an operation input made by a user, and a noise removal unit that performs noise removal processing for removing noise from a collected audio signal collected by a microphone. The noise removal unit changes content of the noise removal processing according to content of the operation input.

An audio signal processing method according to the present invention includes a step of performing noise removal processing for removing noise from a collected audio signal collected by a microphone, and a step of receiving an operation input made by a user. In the step of performing the noise removal processing, content of the noise removal processing is changed according to content of the operation input.

BRIEF DESCRIPTION OF DRAWINGS

FIG. 5 is a diagram that describes processing for transmitting two kinds of audio signals, which is performed by the audio signal processing device according to the embodiment of the present invention.

DESCRIPTION OF EMBODIMENT

Hereinafter, an embodiment of the present invention will be described in detail on the basis of the drawings.

Figure 1:
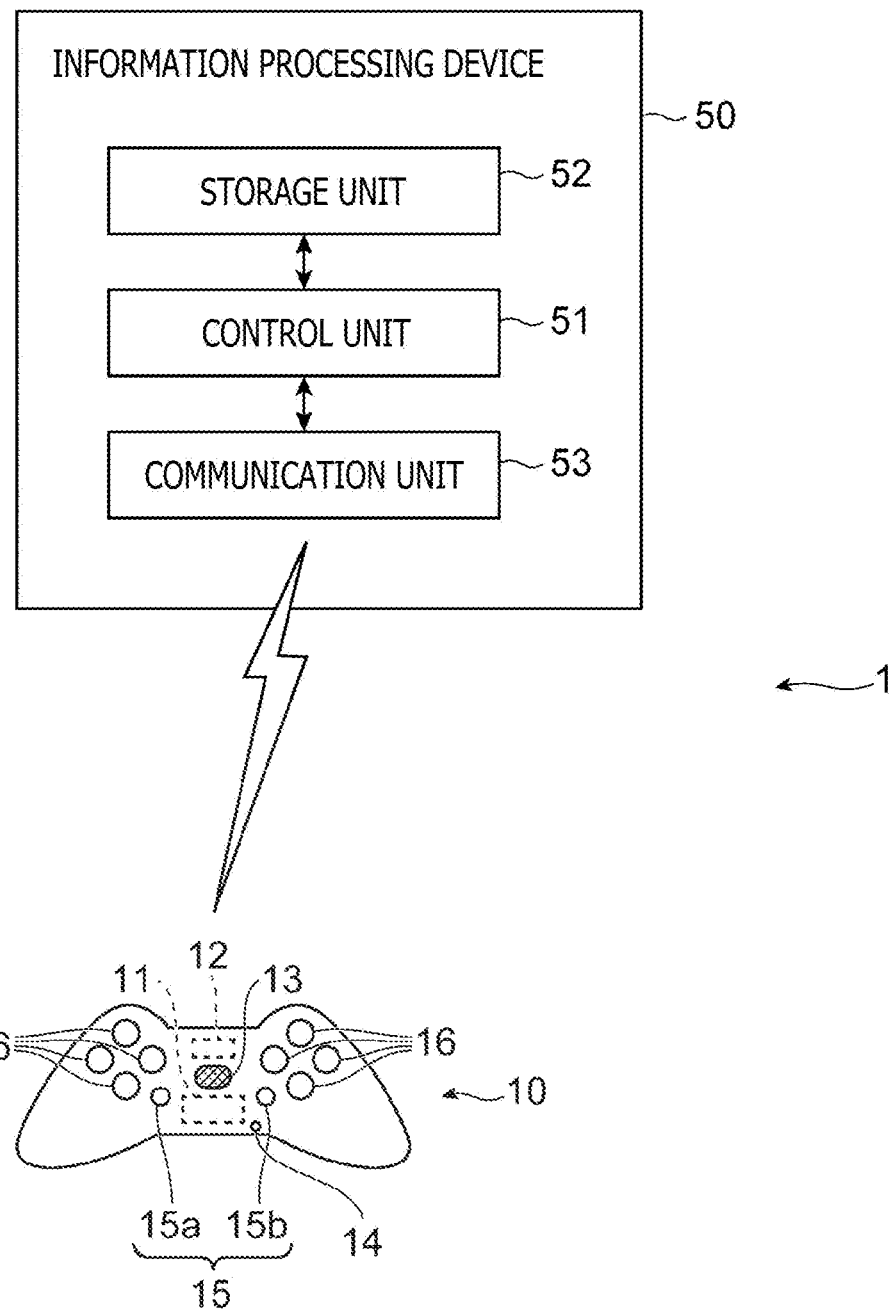
FIG. 1 is an overall configuration diagram of an audio signal processing system including an audio signal processing device according to an embodiment of the present invention.

FIG. 1 is an overall configuration diagram of an audio signal processing system 1 including an audio signal processing device 10 according to the embodiment of the present invention. As illustrated in FIG. 1, the audio signal processing system 1 includes the audio signal processing device 10 and an information processing device 50. In the present embodiment, the audio signal processing device 10 and the information processing device 50 are assumed to transmit and receive data by means of wireless communication conforming to a Bluetooth (registered trademark) standard or the like. Note that, although here the transmission/reception of data is assumed to be performed by means of the wireless communication, the configuration is not necessarily limited to this. The audio signal processing device 10 and the information processing device 50 may be configured to be communicatively connected to each other through a wired link conforming to a standard such as a universal serial bus (USB) standard.

Figure 2:
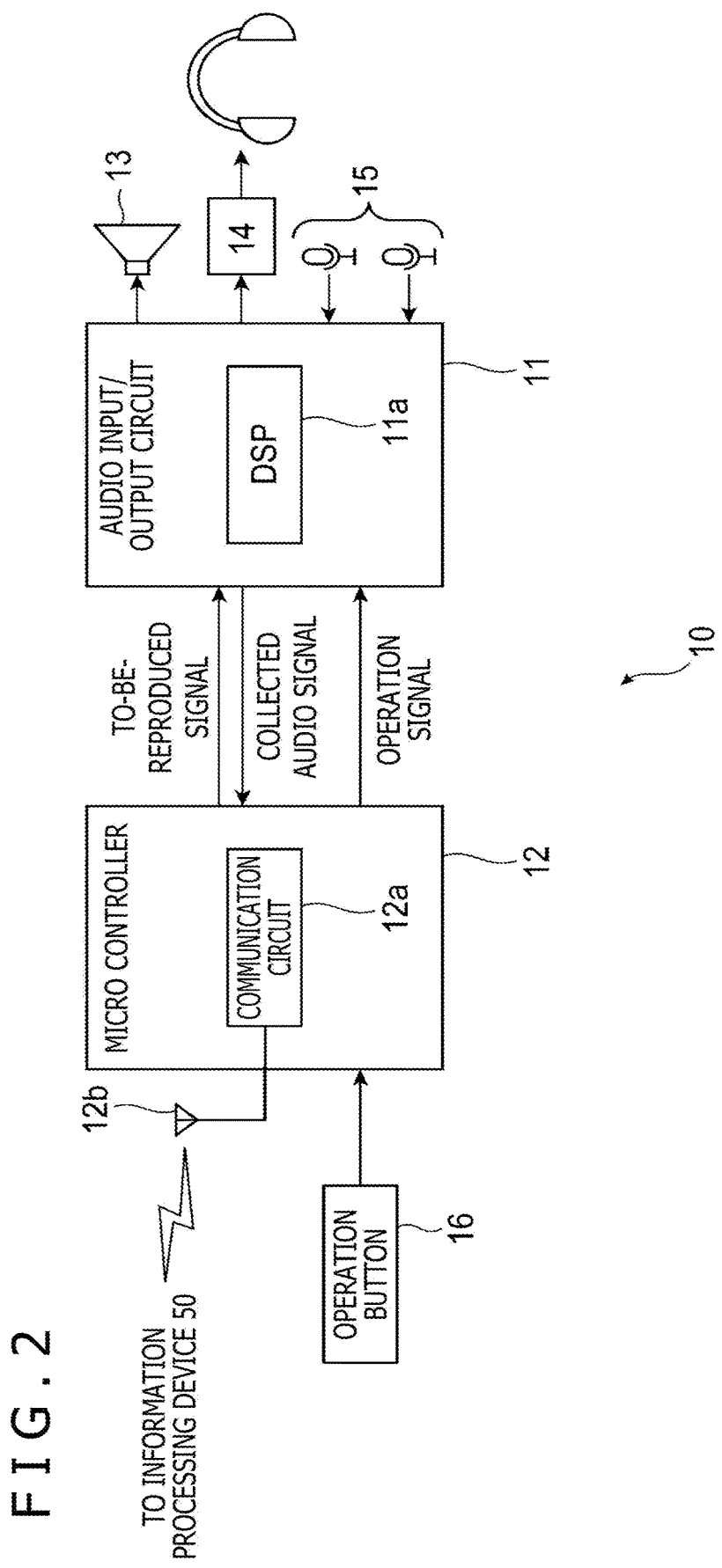
FIG. 2 is a configuration block diagram of the audio signal processing device according the embodiment of the present invention.

FIG. 2 is a configuration block diagram illustrating a schematic hardware configuration of the audio signal processing device 10. The audio signal processing device 10 is, for example, a controller for a home game machine or the like, and, as illustrated in FIG. 2, includes an audio input/output circuit 11, a micro controller 12, a speaker 13, a headphone terminal 14, a microphone 15, and a plurality of operation buttons 16.

The audio input/output circuit 11 is an integrated circuit for controlling the input and output of audio, and incorporates a digital signal processor (DSP) 11a that performs audio signal processing. The audio input/output circuit 11 sounds audio from either the speaker 13 or headphones coupled to the headphone terminal 14, on the basis of an audio signal that the micro controller 12 has received from the information processing device 50. Further, the audio input/output circuit 11 performs necessary audio signal processing on an audio signal collected and obtained by the microphone 15, and then outputs a resultant audio signal to the micro controller 12. Further, in a case where each of the operation buttons 16 has been operated by a user, the audio input/output circuit 11 receives, from the micro controller 12, an operation signal indicating the content of the operation in order to perform noise removal processing described later. The detail of the audio signal processing implemented by the audio input/output circuit 11 will be described later.

The micro controller 12 is an integrated circuit for controlling individual units of the audio signal processing device 10. The micro controller 12 incorporates a communication circuit 12a. The communication circuit 12a is coupled to an antenna 12b and controls wireless communication for giving and receiving information to and from the information processing device 50 via the antenna 12b. Specifically, the communication circuit 12a receives, from the information processing device 50, an audio signal to be reproduced from the speaker 13 described later, or the headphones. Further, the communication circuit 12a transmits, to the information processing device 50, an audio signal obtained by applying the audio signal processing, described later, to an audio signal collected by the microphone 15, the operation signal indicating the content of a user's operation onto any of the operation buttons 16, and the like. In addition, the micro controller 12 may include a communication interface based on an Inter-IC Sound (I2S) standard or the like, as an interface for transmitting and receiving audio signals to and from the audio input/output circuit 11.

The speaker 13 reproduces, in monaural, audio based on an audio signal having been received from the information processing device 50. Headphones supporting a monaural reproduction and headphones supporting a stereo reproduction both can be coupled to the headphone terminal 14, and, in a case where such headphones are coupled to the headphone terminal 14, the audio input/output circuit 11 is also capable of causing audio based on an audio signal having been received from the information processing device 50 to be reproduced from the headphones instead of the speaker 13. The microphone 15 is configured by a microphone array including two microphone elements 15a and 15b, and collects audio of the utterance made by a user who is using the audio signal processing device 10. In the following, an audio signal transmitted from the information processing device 50 to the audio signal processing device 10 for the purpose of being reproduced from the speaker 13 or the headphones will be referred to as a to-be-reproduced audio signal. On the other hand, an audio signal collected and obtained by the microphone 15 will be referred to as a collected audio signal.

The information processing device 50 is, for example, a home game machine, a personal computer, or the like, and includes a control unit 51, a storage unit 52, and a communication unit 53.

The control unit 51 includes at least one processor and performs various kinds of information processing according to programs stored in the storage unit 52. The storage unit 52 includes at least one storage element and stores therein the programs executed by the control unit 51 and data targeted for processing executed by the programs. The communication unit 53 includes a communication interface for giving and receiving information to and from the audio signal processing device 10. In addition, the communication unit 53 may include a communication interface for transmitting and receiving data to and from a different information processing device via a communication link such as the Internet.

In the present embodiment, the information processing device 50 performs speech recognition processing on a collected audio signal having been received from the audio signal processing device 10. Further, the information processing device 50 transmits, to the different information processing device, the collected audio signal having been received from the audio signal processing device 10, in order to cause the collected audio signal to be reproduced at a different location. This configuration makes it possible for the information processing device 50 to specify the content of words that a user has uttered toward the microphone 15 of the audio signal processing device 10 and allow the audio of the utterance to be listened to by a different user who is at a remote location.

Figure 3:
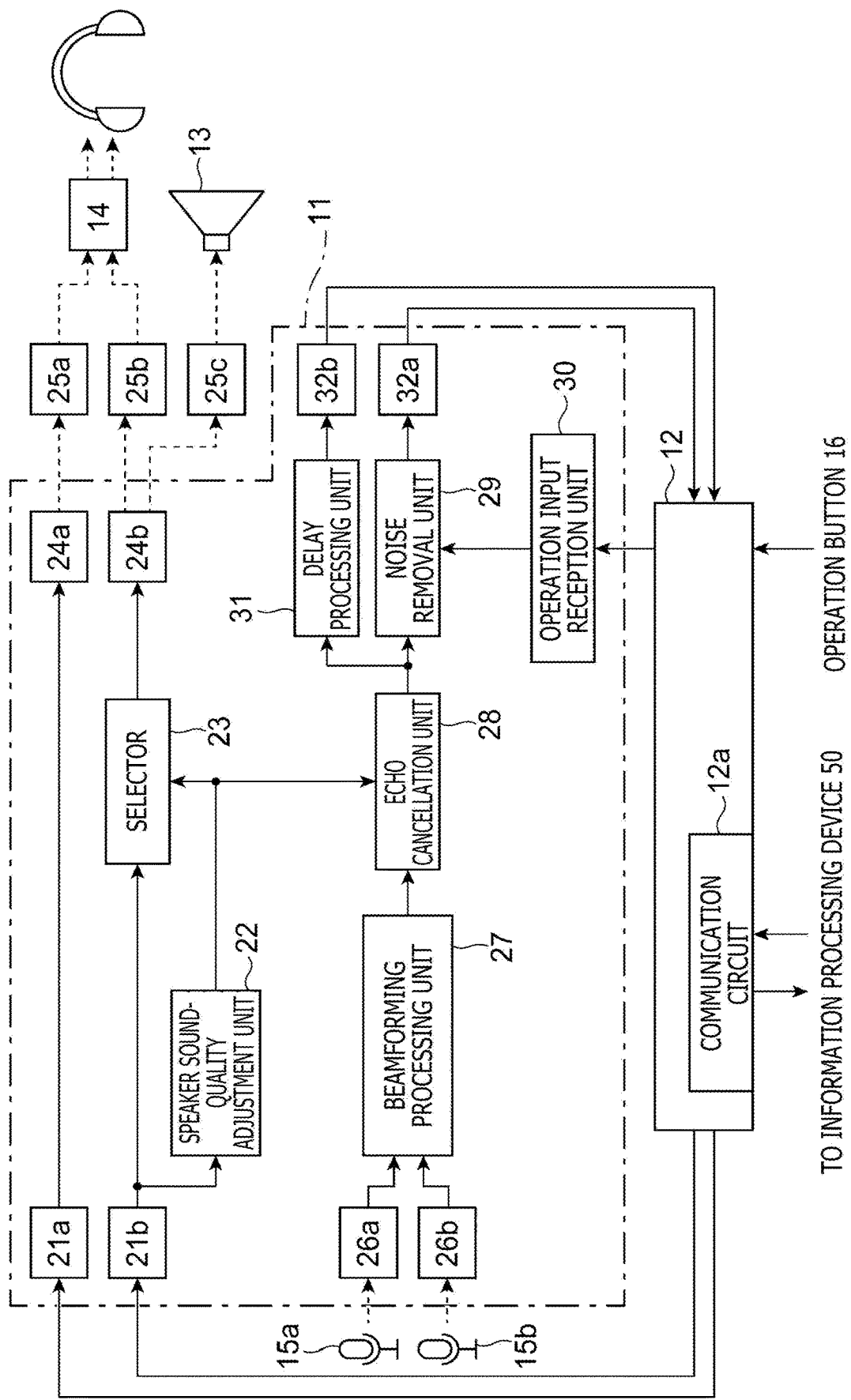
FIG. 3 is a function block diagram of the audio signal processing device according the embodiment of the present invention.

Hereinafter, particularly from a viewpoint of audio signal processing, functions implemented by the audio signal processing device 10 will be described using the function block diagram of FIG. 3. In FIG. 3, transmission paths for digital audio signals are indicated in full lines, and transmission paths for analog audio signals are indicated in dashed lines.

As illustrated in FIG. 3, the audio input/output circuit 11 includes two signal input units 21a and 21b, a speaker sound-quality adjustment unit 22, a selector 23, two digital-to-analog (D/A) converters 24a and 24b, two analog-to-digital (A/D) converters 26a and 26b, a beamforming processing unit 27, an echo cancellation unit 28, a noise removal unit 29, an operation input reception unit 30, a delay processing unit 31, and two signal output units 32a and 32b. Further, three amplifiers 25a, 25b, and 25c are coupled to the audio input/output circuits 11. The functions of the speaker sound-quality adjustment unit 22, the selector 23, the beamforming processing unit 27, the echo cancellation unit 28, the noise removal unit 29, the operation input reception unit 30, and the delay processing unit 31 are implemented by the DSP 11a which serves as an audio signal processing circuit.

First, the content of signal processing that the audio signal processing device 10 performs to cause audio to be reproduced from the headphones or the speaker 13 will be described. The information processing device 50 transmits, to the audio signal processing device 1, stereo (two-channel) digital data signals, as the to-be-reproduced audio signal. These digital data signals are received by the communication circuit 12a, and a data signal of an L (left)-channel and a data signal of an R (right)-channel are respectively input to the signal input unit 21a and the signal input unit 21b.

The L-channel to-be-reproduced audio signal having been input to the signal input unit 21a is input to the D/A converter 24a as it is. On the other hand, the R-channel to-be-reproduced audio signal having been input to the signal input unit 21b is input to the selector 23 and the speaker sound-quality adjustment unit 22. The speaker sound-quality adjustment unit 22 performs processing for improving the sound quality of the audio to be reproduced from the speaker 13 in a case where the headphones are not coupled to the headphone terminal 14 (that is, in a case where the audio is reproduced from the speaker 13). Specifically, the speaker sound-quality adjustment unit 22 performs predetermined equalization processing, compressor processing, and the like on the to-be-reproduced audio signal. The to-be-reproduced audio signal having been adjusted by the speaker sound-quality adjustment unit 22 is input to the selector 23 and the echo cancellation unit 28 described later.

The selector 23 selects a to-be-reproduced audio signal that is to be supplied to the D/A converter 24b. Specifically, in a case where the headphones are coupled to the headphone terminal 14, the selector 23 inputs, to the D/A converter 24b, the R-channel to-be-reproduced audio signal having been input to the signal input unit 21b as it is. On the other hand, in the case where the headphones are not coupled to the headphone terminal 14, the selector 23 inputs, to the D/A converter 24b, the to-be-reproduced audio signal that the speaker sound-quality adjustment unit 22 has adjusted for the reproduction by the speaker 13.

Each of the D/A converters 24a and 24b converts an input digital to-be-reproduced audio signal into an analog signal and supplies this analog signal to a corresponding amplifier. Specifically, the analog audio signal that is output from the D/A converter 24a is amplified by the amplifier 25a, and then is reproduced from the headphones coupled to the headphone terminal 14. Further, in the case where the headphones are coupled to the headphone terminal 14, the analog audio signal that is output from the D/A converter 24b is amplified by the amplifier 25b, and then is reproduced from the headphones. In the case where the headphones are not coupled to the headphone terminal 14, the analog audio signal that is output from the D/A converter 24b is amplified by the amplifier 25c, and then is reproduced from the speaker 13.

Here, in a case where the headphones coupled to the headphone terminal 14 are headphones supporting the monaural reproduction, a configuration may be employed in which the L-channel to-be-reproduced audio signal is reproduced from the headphones, and simultaneously, the R-channel to-be-reproduced audio signal is reproduced from the speaker 13. In this case, even in the case where the headphones are coupled to the headphone terminal 14, the selector 23 selects, as the input thereto, the to-be-reproduced audio signal having been adjusted by the speaker sound-quality adjustment unit 22.

Summarizing the above, the to-be-reproduced audio signal having been input to the signal input unit 21*a* is always transmitted through the D/A converter 24*a* and the amplifier 25*a*, and then is reproduced from the headphones coupled to the headphone terminal 14. On the other hand, the to-be-reproduced audio signal having been input to the signal input unit 21*b* is processed along one of the following two paths. That is, in a case where headphones supporting the stereo reproduction are coupled to the headphone terminal 14, the to-be-reproduced audio signal having been input to the signal input unit 21*b* is transmitted through the selector 23, the D/A converter 24*b*, and the amplifier 25*b*, and then is reproduced from the headphones, whereas, in the case where the audio is reproduced from the speaker 13, the to-be-reproduced audio signal having been input to the signal input unit 21*b* is transmitted through the speaker sound-quality adjustment unit 22, the selector 23, the D/A converter 24*b*, and the amplifier 25*c*, and then is reproduced from the speaker 13.

Next, processing on a collected audio signal having been collected by the microphone 15 will be described. Analog collected audio signals that are output from the individual microphone elements 15*a* and 15*b* are converted into digital data signals by the A/D converters 26*a* and 26*b*. The beamforming processing unit 27 generates collected audio signal data having directivity on the basis of pieces of collected audio signal data that are output by the individual A/D converters 26*a* and 26*b*. In the following processing, the collected audio signal data having been generated by the beamforming processing unit 27 is used as data associated with the audio having been collected by the microphone 15.

Moreover, the echo cancellation unit 28 performs echo cancellation processing on the collected audio signal data having been generated by the beamforming processing unit 27. The echo cancellation processing is processing for canceling, from the collected audio signal, acoustic echo caused by a phenomenon in which the microphone 15 collects the audio reproduced from the speaker 13. The echo cancellation unit 28 performs the echo cancellation processing on the collected audio signal by using, as an input to the echo cancellation unit 28, the to-be-reproduced audio signal used for the speaker reproduction and output by the speaker sound-quality adjustment unit 22. The collected audio signal having been subjected to the echo cancellation processing by the echo cancellation unit 28 is input to the noise removal unit 29 and the delay processing unit 31.

Note that the execution of the echo cancellation processing by the echo cancellation unit 28 is necessary only in the case where the audio is reproduced from the speaker 13, whereas the execution of the echo cancellation processing is unnecessary in the case where the to-be-reproduced audio signal that is output from the D/A converter 24*b* is reproduced from the headphones. In the case where the audio is reproduced from the speaker 13, the audio necessarily becomes audio having been subjected to the adjustment by the speaker sound-quality adjustment unit 22. For this reason, the echo cancellation unit 28 may be configured to, only during a period when the speaker sound-quality adjustment unit 22 performs its adjustment processing, perform the echo cancellation processing by using, as an input to the echo cancellation unit 28, an audio signal resulting from the adjustment processing, and otherwise output a collected audio signal having been input to the echo cancellation unit 28 as it is.

All of the above-described pieces of audio signal processing on the collected audio signal (i.e., the pieces of audio signal processing performed by the beamforming processing unit 27 and the echo cancellation unit 28) are linear signal processing. In contrast thereto, the noise removal processing described below is non-linear signal processing.

The noise removal unit 29 performs noise removal processing, on echo-canceled collected audio signals that is output by the echo cancellation unit 28, for removing the noise. Particularly, in the present embodiment, the noise removal unit 29 performs the noise removal processing by using, as an input to noise removal unit 29, the presence/absence of a user's operation input to any of the operation buttons 16. There is a possibility that, when an operation input to any of the operation buttons 16 is made, an operation sound of the operated button arises and this operation sound is contained, as noise, in a collected audio signal. Thus, in the present embodiment, in a case where a user has made an operation input to any of the operation buttons 16, the micro controller 12 inputs, to the audio input/output circuit 11, an operation signal indicating the event in which the operation input has been made. Upon receipt of the operation signal, the operation input reception unit 30 notifies the noise removal unit 29 of the receipt of the operation input. Upon receipt of the notification from the operation input reception unit 30, the noise removal unit 29 performs, on an assumption that the noise is contained in an audio signal having been collected at the timing of the receipt of operation input, processing for removing the noise.

In contrast to the above, at the timing when no operation input is received, it is assumed that the noise due to the operation of any of the operation buttons is not arising. Thus, the noise removal unit 29 may be configured not to apply the noise removal processing on an audio signal having been collected at such timing. In this regard, however, there is a possibility that the collected audio signal contains noise other than the sound of the operation input having been made to any of the operation buttons 16. For this reason, the noise removal unit 29 preferably applies noise removal processing whose content is different from that in the case where the operation input has been received, even to a collected audio signal in the case where the operation input has not been received. That is, the noise removal unit 29 is configured to change the content of the noise removal processing according to a case in which the operation input to any of the operation buttons 16 has been received and another case in which the operation input to any of the operation buttons 16 has not been received.

Figure 4:
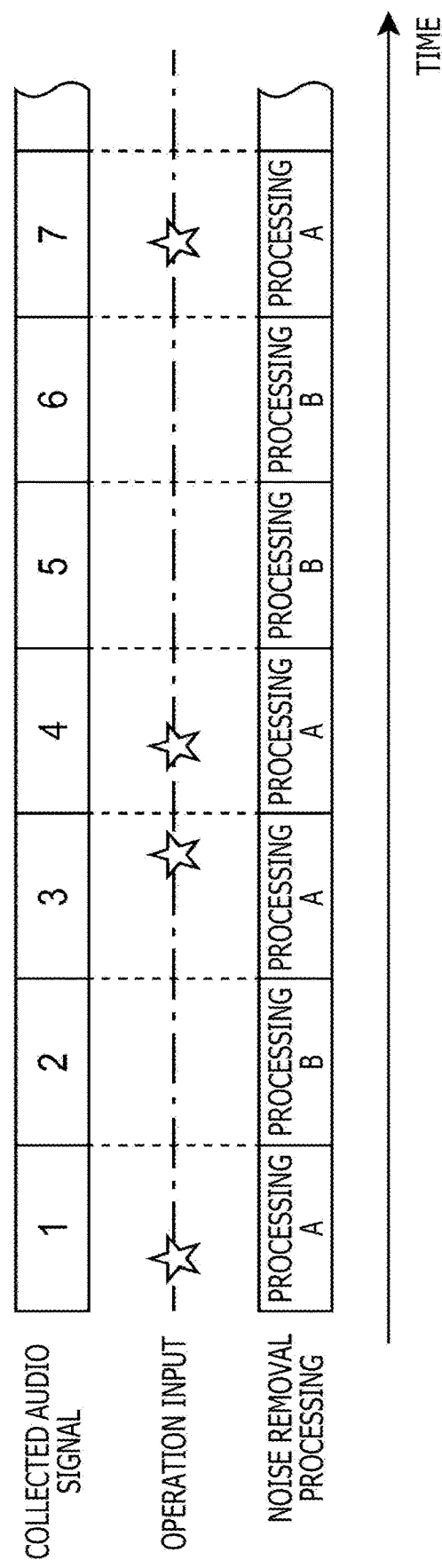
FIG. 4 is a diagram that describes noise removal processing performed by the audio signal processing device according to the embodiment of the present invention.

FIG. 4 is a diagram that describes the kinds of noise removal processing performed by the noise removal unit 29. As illustrated in FIG. 4, the noise removal unit 29 divides, for each of unit times (frames), the collected audio signal into divided audio signals, and performs noise removal processing on a divided audio signal associated with each of the unit times. At this time, the content of the noise removal processing is changed according to whether or not any operation input has been received during a unit time corresponding to the divided audio signal. In the example of FIG. 4, the timing at which the operation input to any of the operation buttons 16 has been received is indicated by a star sign. In each of frames 1, 3, 4, and 7 corresponding to the above timing, noise removal processing assuming the presence of the operation input (which here is denoted by processing A) is performed on a corresponding divided collected audio signal. In contrast, in each of frames 2, 5, and 6, noise removal processing in a case in which there is no operation input (which here is denoted by processing B) is performed on a corresponding divided collected audio signal.

As a specific example, the noise removal unit 29 may be configured to perform the noise removal processing by using filtering algorithms that are optimized according to the presence/absence of the operation input on the basis of mutually different sets of input data. In the example of FIG. 4, one or more parameter values that determine the processing content of the above processing A are adjusted by using, as an input to the noise removal processing, collected audio signals having been obtained at the timings when the operation input has been received, whereas one or more parameter values that determine the processing content of the processing B are adjusted by using, as the input to the noise removal processing, collected audio signals having been obtained at the timings when the operation input has not been received. Because of the different inputs, the set of the one or more parameters for use in the processing A and the set of the one or more parameters for use in the processing B are adjusted into mutually different sets of one or more values. In this way, the noise removal unit 29 is configured to perform the noise removal processing by using the sets of one or more parameters, which have been adjusted for the mutually different kinds of processing. In this way, performing the noise removal processing by using the results of the optimizations that are mutually independently made according to the presence/absence of the operation input on the basis of previously collected audio signals enables achievement of the noise removals suitable for the individual situations.

Note that, in the above configuration, the content of the processing is changed, without any specification as to which operation button among the plurality of operation buttons 16 has been operated, merely on the basis of only the presence/absence of the operation input to any of the operation buttons 16. However, without being limited to the above configuration, the noise removal unit 29 may be configured to change the content of the noise removal processing according to the content of the operation input. As an example, the noise removal unit 29 may be configured to receive information that specifies which operation button among the plurality of operation buttons 16 has been operated, and perform noise removal processing whose content is changed for each of the operation buttons.

Further, the noise removal unit 29 may be configured to change the content of the noise removal processing, for each of a plurality of groups obtained by grouping the plurality of operation buttons 16. The arising operation sound may differ according to, for example, the kinds and the structures of the operation buttons. Further, the loudness level or the like of operation sound collected by the microphone 15 is estimated to differ according to at which of the position near the microphone 15 and the position far from the microphone 15 a corresponding operation button is located. For this reason, the configuration is made such that operation buttons arranged at positions close to one another and operation buttons having similar structures are caused to belong to the same group, and in cases in which operation buttons belonging to the same group have been operated, noise removal processing having content associated with the group is applied. On the other hand, the configuration is made such that, in cases in which operation buttons belonging to mutually different groups have been operated, pieces of noise removal processing having different kinds of content are performed. Specifically, for example, the noise removal unit 29 performs the noise removal processing by using sets of one or more parameters that have been optimized on the basis of sets of input data that differ for each of the groups. In this way, grouping the operation buttons into a plurality of groups according to the arrangement positions, shapes, etc., of the operation buttons, and performing the noise removal processing having mutually different kinds of content associated with the groups enable improvement of the accuracy of the noise removal processing.

Further, in the above configurations, the operation input reception unit 30 receives only the operation input to any of the operation buttons 16. However, the configuration may be made such that operation members of kinds different from the kind of the operation buttons (for example, levers and the like) are disposed in the audio signal processing device 10, and the operation input reception unit 30 further receives an operation input to any of such operation members of different kinds. Moreover, in this case, the noise removal unit 29 may be configured to change the content of the noise removal processing according to the kinds of operation members. This configuration makes it possible to perform, for each of the kinds of operation members, noise removal processing suitable for noise caused by an operation onto any of operation members of the each of the kinds.

Moreover, the operation input reception unit 30 may be configured to receive information regarding the operation mode of a user's operation onto any of operation members, and further, the noise removal unit 29 may be configured to change the content of the noise removal processing on the basis of this information regarding the operation mode. Examples of the information regarding the operation mode include an operation amount, an operation magnitude, an operation speed, and the like. For example, in a case where the operation buttons 16 are buttons for which a push-in amount is detectable, the operation input reception unit 30 receives a detected push-in amount as the information regarding the operation mode. A way of the occurrence of the operation sound is estimated to also change according to the mode of an operation made by a user. For this reason, changing the content of the noise removal processing by using the information regarding the operation mode enables improvement of the accuracy of the noise removal processing.

Further, the operation input reception unit 30 may be configured to receive not only the operation input to any of the operation members disposed on the surface of the housing of the audio signal processing device 10, but also information regarding other kinds of operation inputs. Specifically, the operation input reception unit 30 may be configured to receive, as the content of the operation input, detection values detected by various kinds of sensors incorporated in the audio signal processing device 10. As an example, in a case where a motion sensor such as an acceleration sensor is incorporated in the audio signal processing device 10, when a user makes an operation of moving the audio signal processing device 10 itself, the content of the operation is detected by the motion sensor. In particular, when a user, for example, has brought the audio signal processing device 10 into contact with a certain object, an impact caused by the contact is detected by the motion sensor, and the sound of the impact is collected by the microphone 15. Thus, in a case where an impact having a predetermined magnitude has been detected by the motion sensor, the operation input reception unit 30 receives the content of the impact as the information regarding the operation input. The noise removal unit 29 changes the content of the noise removal processing according to the input of the information. This configuration makes it possible to effectively remove the noise caused by an operation other than the operation onto any of the operation members.

Further, the noise removal unit 29 may be configured to change the content of the noise removal processing on the basis of not only the information associated with the content of the operation input and having been received by the operation input reception unit 30, but also information associated with a usage situation of the audio signal processing device 10 and having been received from the information processing device 50. For example, when a user starts using the audio signal processing device 10, the information processing device 50 sometimes performs authentication processing for identifying who the user is. The information processing device 50 transmits user identification information obtained as the result of the authentication processing to the audio signal processing device 10. Thereafter, the audio signal processing device 10 performs the noise removal processing by using one or more parameters that are stored so as to be associated with the user identification information, and adjusts the values of the individual stored one or more parameters on the basis of the result of the noise removal processing. This configuration makes it possible to perform noise removal processing into which, for each user, a tendency of the operations of the user is reflected.

Further, the noise removal unit 29 may be configured to receive, as the information regarding the usage situation of the audio signal processing device 10, information for identifying a kind of an application program being executed by the information processing device 50, and change the content of the noise removal processing according to the content of the information. For example, in a case where the information processing device 50 executes an application program for a game or the like, a user plays the game by making operations onto the operation buttons 16 disposed on the audio signal processing device 10. At this time, the tendency of operation inputs made by the user changes according to the kind of the game (for example, an action game or an adventure game). Thus, changing the content of the noise removal processing according to the kind of an application program being executed enables achievement of noise removal processing adapted to the tendency of operations made with respect to the application program.

As described above, the removal of various kinds of noise including the operation sound from the collected audio signals by the noise removal unit 29 enables obtaining of audio signals that can be easily listened to by persons. However, as described above, the noise removal processing in the present embodiment corresponds to the non-linear signal processing, and may cause discontinuous changes in signal waveforms. An audio signal to which such non-linear signal processing has been applied may adversely affect the accuracy of speech recognition processing because of audio distortions caused by the non-linear signal processing.

For this reason, in the present embodiment, there is employed a configuration in which the audio signal processing device 10 transmits, to the information processing device 50, both a collected audio signal before the application of the non-linear signal processing (here, the noise removal processing by the noise removal unit 29) and a collected audio signal after the application of the non-linear signal processing. In this way, the information processing device 50 is capable of not only allowing the audio signal to which the non-linear signal processing has already been applied to be used in a usage for listening to by a person who is performing voice chattering or the like, but also of using the audio signal to which the non-linear signal processing is not applied, in mechanical processing such as speech recognition processing. In the following, for convenience of description, a collected audio signal after the execution of the non-linear signal processing (i.e., post-execution audio signal) will be referred to as an audio signal for use in listening, and a collected audio signal before the execution of the non-linear signal processing (i.e., pre-execution audio signal) will be referred to as an audio signal for use in recognition. In this regard, however, the information processing device 50 may be configured to use these audio signals in usages other than the above-described usages. Further, the non-linear signal processing that, in the above configurations, has been applied to only the audio signal for use in listening may include not only the noise removal processing, but also other pieces of signal processing.

The audio signal for use in listening and the audio signal for use in recognition may be mutually independently transmitted to the information processing device 50 at different timings. However, in the present embodiment, there is employed a configuration in which the audio signal processing device 10 collectively transmits these two kinds of audio signals to the information processing device 50. Specifically, the audio input/output circuit 11 includes the two signal output units 32a and 32b, and is configured such that the signal output unit 32a and the signal output unit 32b are capable of outputting the audio signal for use in listening and the audio signal for use in recognition, respectively, in parallel to each other. This configuration enables the audio input/output circuit 11 to output the two kinds of audio signals at the same time. The communication circuit 12a of the micro controller 12 unifies the two kinds of audio signals into one audio signal, and transmits the one audio signal to the information processing device 50. That is, the communication circuit 12a transmits the two kinds of audio signal to the information processing device 50 as audio signal data in the form of multi-channels including an L channel in which one of the two kinds of audio signals is stored and an R channel in which the other one of the two kinds of audio signals is stored. This configuration makes it possible for the micro controller 12 to achieve the transmission using a publicly-known module conforming to a standard such as the I2S standard, and transmit the two kinds of audio signals in parallel in a method similar to that for the transmission of normal stereo audio signals.

Moreover, in the present embodiment, the audio signal processing device 10 is configured to, in a case where the two kinds of audio signals are transmitted in parallel, make an adjustment in such a way that simultaneously transmitted audio signals become audio signals having been collected at close timings. Specifically, the audio signal for use in recognition is an audio signal after the application of the echo cancellation processing performed by the echo cancellation unit 28, and simultaneously is an audio signal before the provision of the noise removal processing performed by the noise removal unit 29. Thus, the audio signal for use in recognition is already in a transmittable state at the timing of starting the noise removal processing. However, it takes some amount of time to perform the noise removal processing, and the audio signal for use in listening is not generated until the completion of the noise removal processing. For this reason, in the present embodiment, there is employed a configuration in which the delay processing unit 31 delays the start of transmitting the audio signal for use in recognition by temporarily buffering the audio signal for use in recognition during a period until a time expected to be needed to complete the noise removal processing has elapsed.

Such control as described above makes it possible to cause simultaneously transmitted audio signals to be audio signals having been collected at approximately the same time. FIG. 5 is a diagram that describes the content of the above control, and illustrates a time chart of processing performed on an audio signal having been collected during a certain time interval Ti. The example of FIG. 5 illustrates a condition in which two kinds of audio signals corresponding to the same time interval are collectively transmitted by allowing the delay processing unit 31 to delay the start of transmitting the audio signal for use in recognition by a time ΔT needed to complete the noise removal processing.

Such a configuration that causes the audio signal for use in listening and the audio signal for use in recognition that correspond to the same time interval to be transmitted at the same time enables improvement of a transmission efficiency at the time of transmitting audio signals from the audio signal processing device 10 to the information processing device 50. Specifically, when the audio signals are transmitted via a wireless link, the micro controller 12 performs compression and encoding on the audio signals on the basis of predetermined voice codecs. Here, in a case where, as described above, the two kinds of audio signals, namely, the audio signal for use in listening and the audio signal for use in recognition, are transmitted as stereo audio signals, the micro controller 12 performs encoding using a codec for stereo audio. At this time, the higher the correlation between the L-channel audio signal and the R-channel audio signal is (that is, the more similar both of these signals are), the higher the compression efficiency at the time of the encoding can be made. Further, in general, the codec for stereo audio operates on an assumption that the L-channel audio signal and the R-channel audio signal are pieces of data close to each other. Thus, implementing the configuration that allows the audio signal for use in listening and the audio signal for use in recognition to be handled as stereo audio signals makes it possible to increase the correlation between both of these signals, and perform the encoding efficiently.

The communication unit 53 of the information processing device 50 receives the audio signals having been transmitted from the audio signal processing device 10 according to the procedure described above. The control unit 51 performs pieces of mutually different processing on the two individual kinds of audio signals having been received. Specifically, the control unit 51 performs speech recognition processing for analyzing the content of words having been uttered by a user by extracting the audio signal for use in recognition from one channel of the received stereo audio signals, and inputting the extracted audio signal for use in recognition into a speech recognition engine. At this time, the audio signal for use in recognition is a signal to which the non-linear signal processing is not applied, and thus, the accuracy of the speech recognition can be improved, as compared with the signal to which the non-linear signal processing has been applied.

Further, the information processing device 50 extracts the audio signal for use in listening from the other channel of the same stereo audio signals, and performs transmitting processing for transmitting the extracted audio signal for use in listening, to a different information processing device via a communication network. The different information processing device having received the audio signal for use in listening causes the audio signal to be reproduced from a speaker or the like. This configuration makes it possible to communicate, on a real-time basis, the content of a talk having been made by a user of the audio signal processing device 10 to a different user at a remote location, and thus enables achievement of audio communication such as voice chattering. At this time, audio to which the different user listens is audio to which the noise removal processing has been applied, and thus, noise such as the operation sound is removed from the audio, thereby allowing the audio to be easy for persons to listen to.

Note that, in the description so far, the configuration in which the audio signal processing device 10 constantly transmits the two kinds of audio signals to the information processing device 50 has been described, but the configuration is not limited to this. The audio signal processing device 10 may be configured to switch the kind of an audio signal to be transmitted, according to a request from the information processing device 50. Specifically, the information processing device 50 may be configured to request only the audio signal for use in recognition when attempting to perform the speech recognition processing, and to request only the audio signal for use in listening when not needing the speech recognition processing and attempting to perform only voice chattering. The audio signal processing device 10 is configured to, in response to such requests, make switching among modes, namely, a mode in which the two kinds of audio signals are transmitted in parallel, a mode in which only the audio signal for use in recognition is transmitted, and a mode in which only the audio signal for use in listening is transmitted. Particularly, in a case where only one of the two kinds of audio signals is transmitted, the transmission efficiency can be improved, as compared with a case where the two kinds of audio signals are transmitted in parallel.

The audio signal processing device 10 according to the above-described embodiment of the present invention makes it possible to improve the accuracy of the noise removal processing by changing the content of the noise removal processing according to the presence/absence of the operation input.

Further, the audio signal processing device 10 according to the embodiment of the present invention transmits, to the information processing device 50, both the audio signal for use in recognition and the audio signal for use in listening that are based on the same collected audio signal, and thereby makes it possible that the information processing device 50 performs the speech recognition processing, the transmitting processing for external transmission for allowing persons to listen to, and the like, by using the audio signals to each of which appropriate processing has been applied.

Note that, in the present embodiment, the information indicating the presence/absence of the operation input and having been received by the operation input reception unit 30 is used for the noise removal processing. Thus, the noise removal processing is preferably performed by the audio signal processing device 10, not by the information processing device 50. This is because, in a case where a discrepancy occurs between the timing when an operation sound is caused by an actual operation input by a user and the timing when the information processing device 50 receives the operation input, it becomes difficult to accurately perform the processing for removing the noise due to the operation sound.

Note that embodiments of the present invention are not limited to the embodiment described above. For example, in the above description, it has been described that the audio signal processing device 10 is a controller for a home game machine. However, without being limited to this description, the audio signal processing device 10 may be any of various kinds of equipment such as electronic equipment equipped inside its housing with a microphone, a speaker, and operation buttons. Further, the pieces of processing having been configured, in the above description, to be performed by the information processing device 50 may be configured to be distributed and separated into and performed by a plurality of computers. As an example, the information processing device 50 may include a client device and a server device that are coupled to each other via a communication network. In this example, the client device is directly coupled to the audio signal processing device 10 and receives the two kinds of audio signals from the audio signal processing device 10, and the server device receives any one of or both of the two kinds of audio signals from the client device and performs predetermined pieces of processing on the received one of or both of the two kinds of audio signals. Further, the pieces of processing having been configured, in the above, to be performed by the server device may be configured to be further distributed and separated into and performed by a plurality of computers.

Further, the above-described hardware configuration and circuit configuration of the audio signal processing device 10 are just examples, and the flows of signal processing may be different from those described above. For example, the echo cancellation unit 28 may be configured to perform the echo cancellation processing on a collected audio signal having been collected by a single microphone element. Further, the configuration may be made such that each of a plurality of collected audio signals obtained by a plurality of microphone elements is subjected to the echo cancellation processing, and then is subjected to the beamforming processing. Further, a configuration in which audio signal processing such as down-sampling is performed on the audio signal is employed as needed. Moreover, in the present embodiment, there is employed the configuration in which the audio signal for use in listening is generated by additionally performing the noise removal processing on an audio signal for use in recognition, whereas the noise removal processing is not performed on the audio signal for use in recognition. However, another configuration may be employed in which signal processing having a relatively small possibility of affecting the speech recognition processing is applied to even the audio signal for use in recognition, and then the audio signal for use in recognition is transmitted to the information processing device 50.

Further, one or more partial functions among the functions having been configured, in the above description, to be implemented by the audio input/output circuit 11 may be implemented outside the audio input/output circuit 11. For example, functions, such as those of the D/A converters 24a and 24b and the A/D converters 26a and 26b, which have been configured, in the above description, to be implemented by the audio input/output circuit 11 may be implemented by different circuit elements disposed outside the audio input/output circuit 11. Further, partial processing of the audio signal processing having been configured, in the above description, to be performed by the DSP 11a of the audio input/output circuit 11 may be performed inside the micro controller 12. In contrast, at least a portion of the processing, such as encoding processing of audio signals, having been configured, in the above description, to be performed by the micro controller 12 may be performed in the audio input/output circuit 11. Further, in the above description, it has been described that the audio input/output circuit 11 and the micro controller 12 each are a single integrated circuit, but the audio input/output circuit 11 and the micro controller 12 each may be implemented by a plurality of integrated circuits. Further, the functions of the audio input/output circuit 11 and the micro controller 12 may be implemented by a single integrated circuit.

REFERENCE SIGNS LIST

1: Audio signal processing system
10: Audio signal processing device
11: Audio input/output circuit
11a: DSP
12: Micro controller
12a: Communication circuit
12b: Antenna
13: Speaker
14: Headphone terminal
15: Microphone
15a, 15b: Microphone element
16: Operation buttons
21a, 21b: Signal input unit
22: Speaker sound-quality adjustment unit
23: Selector
24a, 24b: D/A converter
25a, 25b, 25c: Amplifier
26a, 26b: A/D converter
27: Beamforming processing unit
28: Echo cancellation unit
29: Noise removal unit
30: Operation input reception unit
31: Delay processing unit
32a, 32b: Signal output unit
50: Information processing device
51: Control unit
52: Storage unit
53: Communication unit

The invention claimed is:

1. An audio signal processing device comprising:
an operation input reception unit that receives an operation input made by a user;
a noise removal unit that performs noise removal processing for removing noise from a collected audio signal collected by a microphone;
an acquisition unit that acquires user identification information for identifying who the user using the audio signal processing device is; and
a storage unit that stores a parameter that determines content of the noise removal processing, such that the parameter is stored in association with the user identification information having been acquired by the acquisition unit, wherein:
the noise removal unit performs the noise removal processing by changing the content of the noise removal processing according to content of the operation input and using the parameter stored in association with the user identification information having been acquired by the acquisition unit, and subsequently adjusts, on a basis of a result of the noise removal processing, a value of the parameter stored in association with the user identification information having been acquired by the acquisition unit,
the noise removal unit changes the content of the noise removal processing according to a first case in which the operation input has been received and a second case in which the operation input has not been received, and the noise removal unit performs the noise removal processing, by using, as inputs to the noise removal processing, divided collected audio signals associated with unit times and obtained by dividing, for each of the unit times, the collected audio signal collected while the audio signal processing device is being used by a user, makes mutually different kinds of adjustments to determine content of the noise removal processing according to a first case in which the operation input has been received during a unit time constituting the unit times and corresponding to each of one or more of the divided collected audio signals and a second case in which the operation input has not been received during the unit time, and performs, with respect to a target divided collected audio signal included in the divided collected audio signals and associated with each of the unit times, the noise removal processing having the content determined by the mutually different kinds of adjustments, according to whether or not the operation input has been received during a unit time constituting the unit times and corresponding to the target divided collected audio signal.

2. The audio signal processing device according to claim 1, further comprising:
a plurality of operation members,
wherein the noise removal unit changes the content of the noise removal processing according to which of the operation members an operation member included in the operation members and having received the operation input is.

3. The audio signal processing device according to claim 2, wherein the noise removal unit groups the plurality of operation members into a plurality of groups and changes the content of the noise removal processing according to which of the groups an operation member included in the operation members and having received the operation input belongs to.

4. The audio signal processing device according to claim 3, wherein one or more operation members belonging to each of the plurality of groups are determined according to at least one of a kind and an arrangement position of each of the plurality of operation members.

5. The audio signal processing device according to claim 1, wherein the noise removal unit changes the content of the noise removal processing according to an operation mode of the operation input.

6. An audio signal processing method comprising:
performing noise removal processing for removing noise from a collected audio signal collected by a microphone;
receiving an operation input made by a user;
acquiring user identification information for identifying who the user is; and
storing a parameter that determines content of the noise removal processing, such that the parameter is stored in association with the user identification information having been acquired,
wherein, in the performing the noise removal processing, the noise removal processing is performed by:
changing the content of the noise removal processing according to content of the operation input and using the parameter stored in association with the user identification information having been acquired, and subsequently, a value of the parameter stored in association with the user identification information having been acquired is adjusted on a basis of a result of the noise removal processing,
changing the content of the noise removal processing according to a first case in which the operation input has been received and a second case in which the operation input has not been received, and
by using, as inputs to the noise removal processing, divided collected audio signals associated with unit times and obtained by dividing, for each of the unit times, the collected audio signal collected while an audio signal processing device is being used by a user, makes mutually different kinds of adjustments to determine content of the noise removal processing according to a first case in which the operation input has been received during a unit time constituting the unit times and corresponding to each of one or more of the divided collected audio signals and a second case in which the operation input has not been received during the unit time, and performs, with respect to a target divided collected audio signal included in the divided collected audio signals and associated with each of the unit times, the noise removal processing having the content determined by the mutually different kinds of adjustments, according to whether or not the operation input has been received during a unit time constituting the unit times and corresponding to the target divided collected audio signal.

* * * * *